US011170278B2

(12) United States Patent
Knorr, III et al.

(10) Patent No.: US 11,170,278 B2
(45) Date of Patent: Nov. 9, 2021

(54) TARTAN ENCODING AND DECODING SYSTEM

(71) Applicant: Knorr Ventures, LLC, Austin, TX (US)

(72) Inventors: Robert J. Knorr, III, Austin, TX (US); Gilbert Reynolds, Waco, TX (US); Rosemarie Knorr, Austin, TX (US); Maria Knorr, Austin, TX (US)

(73) Assignee: Knorr Ventures, LLC, Austin, TX (US)

( * ) Notice: Subject to any disclaimer, the term of this patent is extended or adjusted under 35 U.S.C. 154(b) by 0 days.

(21) Appl. No.: 17/006,162

(22) Filed: Aug. 28, 2020

(65) Prior Publication Data

US 2021/0081737 A1 Mar. 18, 2021

Related U.S. Application Data

(60) Provisional application No. 62/900,172, filed on Sep. 13, 2019.

(51) Int. Cl.
*G06K 19/06* (2006.01)
*G06F 9/30* (2018.01)

(52) U.S. Cl.
CPC ... *G06K 19/06037* (2013.01); *G06F 9/30003* (2013.01)

(58) Field of Classification Search
CPC .............. G06K 19/06037; G06F 9/30003
See application file for complete search history.

(56) References Cited

U.S. PATENT DOCUMENTS

D740,034 S 10/2015 Cleveland
2007/0263008 A1 11/2007 Li
(Continued)

FOREIGN PATENT DOCUMENTS

WO WO-2018129051 A1 7/2018
WO WO-2019/240867 A1 12/2019

OTHER PUBLICATIONS

Zuckerman, Ethan, "My new quest—replacing QR codes with tartan | My heart's in Accra," http://www.ethanzuckerman.com/blog/2011/12/16/my-new-quest-replacing-qr-codes-with-tartan/ {Jul. 9, 2019 3:52:37 PM], 6 pages.
(Continued)

*Primary Examiner* — Laura A Gudorf
(74) *Attorney, Agent, or Firm* — Shackelford, Bowen, McKinley & Norton, LLP

(57) ABSTRACT

In an embodiment, a method of tartan encoding includes receiving first and second information elements for use in generating a tartan design. The method also includes generating a primary pattern for the tartan design using the first and second information elements, the primary pattern including a plurality of primary band counts that are each derived from a combination of the first and second information elements and a plurality of primary, colors. The method also includes generating a secondary pattern for the tartan design, the secondary pattern including a plurality of secondary band counts and a plurality of secondary colors. The method also includes generating a band-level machine instruction set for the tartan design, the band-level machine instruction set representing the primary pattern and the secondary, pattern.

20 Claims, 11 Drawing Sheets

(56) References Cited

U.S. PATENT DOCUMENTS

| | | | |
|---|---|---|---|
| 2010/0075557 | A1 | 3/2010 | Shteiyer |
| 2013/0105029 | A1 | 5/2013 | Hannes et al. |
| 2014/0034719 | A1 | 2/2014 | Summers et al. |
| 2017/0233904 | A1 | 8/2017 | Weening et al. |
| 2019/0325279 | A1 | 10/2019 | Wang et al. |
| 2020/0193251 | A1* | 6/2020 | Ellis .................. G05B 19/4097 |

OTHER PUBLICATIONS

Datainsure, Constraint Aesthetics | Encoding Process | Algorithms & Nature, "Knitting Spies & Crochet Ciphers," Oct. 26, 2017, 10 pages.

Hirst, Catherine et al., "Knitted Letters," © 2013, 4 pages.

CNNMoney (Washington), "JanSport's high-tech backpack gives teens a new way to express themselves," https://money.cnn.com/2017/06/20/technology/startups/jansport-programmable-backpack/index.html, Aug. 24, 2020, 6 pages.

Templer, Karen, "Knitting in code," Fringe Association, Jan. 13, 2012, 10 pages.

Matheson, Rob, MIT News, Massachusetts Institute of Technology, "FFOA and VMS launch Advanced Fabrics Entrepreneurship Program," Apr. 13, 2018, 5 pages.

Zarrelli, Natalie, Atlas Obscura, "The Wartime Spies Who Used Knitting as an Espionage Tool," Jun. 1, 2017, https://www.atlasobscura.com/articles/knitting-spies-wwi-wwii, 5 pages.

tartanmaker.com, "Tartan Designer—Tartan Background pattern generator," http://www.tartanmaker.com/[Jul. 9, 2019 4:01:02 PM}, 2 pages.

"Textiles Encoded With Text Messages, Using WWII Cryptogrtaphy," https://www.fastcompany.com/1669961/textiles-encoded-with-text-messages-using-wwii-cryptography[Jul. 9, 2019 3:53:58 PM], 8 pages.

String Geekery, "Secret code summary," https://gannetdesigns.com/embedding-meaning-in-your-knitting-or-other-crafts/secret-code-summary/[Jul. 9, 2019 3:56:30 PM], 9 pages.

Daly, Molly, "Drexel University freshmen Get 'Smart' Backpacks—CBS Philly," Sep. 17, 2017, 5 pages.

The World's First Tartan Database, HOUSE of TARTAN®, "Interactive Weaver—Weave your own Tartan," https://www.houseoftartan.co.uk/interactive/weaver/index.htm[Jul. 9, 2019 4:03:13 PM], 2 pages.

Raw Color, http://rawcolor.nl/project/?id=360&type=ownProduction[Jul. 9, 2019 3:55:15 PM], 16 pages.

"Design your own Tartan at Scotweb Kilt & Tartan Store," https://www.scotweb.co.uk/tartandesign/design/[Jul. 9, 2019 4:01:47 PM], 2 pages.

Wired Staff, "British POW Uses Morse Code to Stitch Hidden Message During WWII," https://www.wired.com/2012/01/british-pow-uses-morse-code-to-stitch-hidden-message-during-wwii/[Jul. 9, 2019 3:59:48 PM], 8 pages.

Grimble, Ian, "Scottish Clans & Tartans," p. 9, 1993, 3 pages.

Paxton, "The Celtic World," Course Guidebook, The Great Courses, 2018, 265 pages.

* cited by examiner

TARTAN ENCODING AND DECODING SYSTEM

CROSS-REFERENCE TO RELATED APPLICATIONS

This patent application claims priority from U.S. Provisional Patent Application No. 62/900,172, filed on Sep. 13, 2019. U.S. Provisional Patent Application No. 62/900,172 is hereby incorporated by reference.

BACKGROUND

Technical Field

The present disclosure relates generally to information encoding and more particularly, but not by way of limitation, to tartan encoding and decoding systems.

BRIEF DESCRIPTION OF THE DRAWINGS

A more complete understanding of the method and apparatus of the present disclosure may be obtained by reference to the following Detailed Description when taken in conjunction with the accompanying Drawings wherein.

SUMMARY

Figure 1:
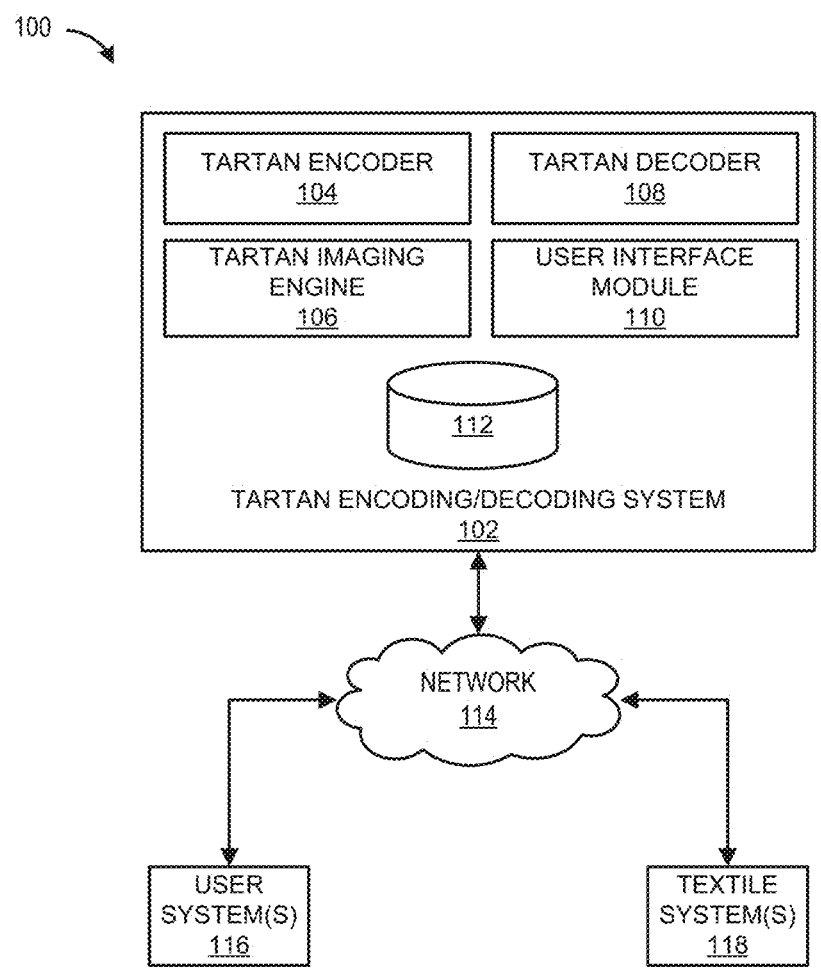
FIG. 1 illustrates an example of a computing environment for encoding and decoding tartans.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method of tartan encoding. The method includes receiving first and second information elements for use in generating a tartan design. The method also includes generating a primary pattern for the tartan design using the first and second information elements, the primary pattern including: a plurality, of primary band counts that are each derived from a combination of the first and second information elements; and a plurality of primary colors, the plurality of primary colors including a color for each of the plurality of primary band counts. The method also includes generating a secondary pattern for the tartan design, the secondary pattern including: a plurality of secondary, band counts; and a plurality of secondary colors, the plurality of secondary colors including a color for each of the plurality of secondary band counts. The method also includes generating a band-level machine instruction set for the tartan design, the band-level machine instruction set representing the primary pattern and the secondary pattern. Other embodiments of this aspect include corresponding computer systems, apparatus, and computer programs recorded on one or more computer storage devices, each configured to perform the actions of the methods.

In an embodiment, another general aspect includes a system that further includes a processor and memory. The processor and memory in combination are operable to implement a method. The method includes receiving first and second information elements for use in generating a tartan design. The method also includes generating a primary pattern for the tartan design using the first and second information elements, the primary pattern including: a plurality of primary band counts that are each derived from a combination of the first and second information elements; and a plurality of primary colors, the plurality of primary colors including a color for each of the plurality of primary band counts. The method also includes generating a secondary pattern for the tartan design, the secondary pattern including: a plurality of secondary, band counts; and a plurality of secondary colors, the plurality of secondary colors including a color for each of the plurality of secondary band counts. The method also includes generating a band-level machine instruction set for the tartan design, the band-level machine instruction set representing the primary pattern and the secondary pattern.

In an embodiment, another general aspect includes a computer-program product that further includes a non-transitory computer-usable medium having computer-readable program code embodied therein. The computer-readable program code is adapted to be executed to implement a method. The method includes receiving first and second information elements for use in generating a tartan design. The method also includes generating a primary pattern for the tartan design using the first and second information elements, the primary pattern including: a plurality of primary band counts that are each derived from a combination of the first and second information elements; and a plurality of primary colors, the plurality of primary colors including a color for each of the plurality of primary band counts. The method also includes generating a secondary pattern for the tartan design, the secondary pattern including: a plurality of secondary band counts; and a plurality of secondary colors, the plurality of secondary colors including a color for each of the plurality of secondary band counts. The method also includes generating a band-level machine instruction set for the tartan design, the band-level machine instruction set representing the primary pattern and the secondary pattern.

DETAILED DESCRIPTION

Since the beginning of recorded history, personally identifiable information (PIT) has played an important role in initial interactions between people; this is exemplified in the famous palindrome hypothesizing on the very first interchange between two people—"Madam I'm Adam." During this initial interchange, the need to disclose PII or any, other information was not relevant for obvious reasons. Over time, the use of PII has become more relevant in order to distinguish a person from the billions of other people that have been born at various times and places throughout the world. At the same time, safeguarding the disclosure of certain PH has become an important priority to many people who wish to share certain PII only with others who have a "need to know" or with whom they share a common association.

Today, when a person interacts with someone for the first time, it is not uncommon for that person to disclose certain relevant objective information. For example, a simple statement like—"I was born in Philadelphia, Pa. in 1960 . . . " distinguishes that particular person from 99% of the billions of people who have ever lived. This voluntary disclosure of limited PII might also involve the disclosure of certain subjective information. For example, by adding—" . . . and my favorite colors are blue and green . . . "—that particular person is able to further distinguish himself or herself from the subset of people who were also born in Philadelphia, Pa. in 1960. This initial exchange of information can serve as a catalyst for further interchange between two or more persons as they seek to find a common association such as the same: place of birth, age, or favorite colors. This interchange may lead to the voluntary disclosure of additional information that may be either objective or subjective and may even change over time. For example, by adding—" . . . and I have two children." that same person is able to further distinguish himself or herself from the smaller subset of people whose favorite colors are blue and green and were also born in Philadelphia, Pa. in 1960. The voluntary disclosure of such objective and subjective information provided by one person to another is intended to initiate a deeper, more meaningful interchange that may reveal a deeper understanding of, or common association with the other person.

An organization is typically a group of people who share some common association, identity, or purpose. Organizations can be informal groups of people but are often comprised of members who are legally connected to the organization as is the case in a university, corporation, religious group, or trade union. Like individual persons, organizations can also be identified by a set of objective information that is unique to that organization; such as the time and place it was first established. For example, the simple statement— "This organization was founded in Columbus, Ohio in 1870 . . . "—distinguishes that particular organization from 99% of the millions of organizations that have ever been established. Organizations may also be identified by certain other information that further distinguishes it from other organizations. For example, adding—" . . . and many of our members wear red and gray apparel . . . " further distinguishes that particular organization from other organizations that may have also been founded in Columbus, Ohio in 1870. Organizations may further distinguish themselves with additional information that may be either objective or subjective and may even change over time. For example, by adding—" . . . and our organization currently operates 17 separate academic schools."—further distinguishes that particular organization from the smaller subset of organizations whose members are associated with the colors red and gray and were also established in Columbus, Ohio in 1870. The disclosure of such objective and subjective information provided by the organization is likely to be intended to promote identification of, or association with the organization. Unlike individual persons, organizations are inanimate entities; for this reason, organizations rely either on people associated with them, or graphic symbols representative of them, to communicate certain information about them to others. Although graphic symbols are inanimate objects, they can become steady, stoic icons representing members of an organization. People, on the other hand, are animated and able to provide extemporaneous information about the organization they represent. However, since people are not always efficient, and graphic symbols are not always effective, organizations often use a combination of both people and symbols to ensure that relevant information about the organization is disseminated accurately to those with some association with it.

One way to identify an organization, for example, might be to use graphic symbols to create an association between the graphic symbol and the organization it is meant to represent. Graphic symbols may include logos and/or certain alphanumeric characters that help to convey general information about the organization to others. However, in order to effectively convey even limited objective information about an organization, the graphic symbol must often include some alphanumeric characters. For example, objective information such as the year the organization was founded may be conveyed effectively and efficiently by including the alphanumeric characters—"Established in 1870" in the graphic symbol. When a graphic symbol does not include alphanumeric characters, it generally imbues only subjective qualities about the organization it represents; for example, the use of iconic mascots are often incorporated in logos to convey some subjective quality about the organization. When a graphic symbol is rendered using; some combination of the three primary colors (i.e. red, yellow, and blue) and/or black, white, shades of gray, it may also imbue additional subjective qualities about the organization it represents. Although the use of colors in a particular graphic design may help distinguish it from another similar design, the choice of color is ultimately subjective and does not itself convey any objective information about the organization it is meant to represent.

Over the centuries, groups of people have used graphic designs to create an association between themselves and the organization the graphic design is meant to represent. For example, in certain cultures people who are part of an extended family (aka "clans") have used interwoven graphic designs (e.g. plaids or tartans) to associate themselves with others in their extended family. The use of interwoven graphic designs in apparel can be particularly useful for organizations because the design is visible, mobile, and proximal to the person(s) who has some association with the organization. However, although a traditional interwoven graphic design may be capable of imbuing an association between an organization and its members, it is incapable of conveying any objective information about the organization.

As the use of graphic designs has become more pervasive, larger organizations (e.g. universities, corporations, religious groups, etc.) have sought to promote the use of graphic designs associated with them. In certain instances, organizations may include limited alphanumeric characters (e.g. "1870") in their design to infer that the organization represented by the graphic design was founded in the calendar year 1870. In other instances organizations have sought protection of graphic designs based solely on a combination of certain colors rendered in an interwoven design. In such instances, although the choice of colors may be commonly associated with the organization, the interwoven graphic design does not itself convey any objective qualities about the organization without the use of alphanumeric characters.

In general, there is a direct correlation between the amount of information that can be conveyed about an organization and the amount of alphanumeric characters that are incorporated in the graphic design. For example, a red and gray shirt with the words—"Ohio State University founded in Columbus, Ohio in 1870"—would effectively communicate certain objective identifiable information about the organization without relying on a person who may be wearing the read and gray shirt to convey the same information. By comparison, a red and gray shirt with only the letter "O" with a logo depicting a buckeye would communicate far less information about the organization and would rely on the person wearing the shirt to effectively convey accurate information about the time and location of the organization's founding. By further comparison, a red and gray shirt with no alphanumeric characters or logo would communicate almost no information about the organization and would be entirely dependent upon the person wearing the shirt to effectively convey accurate and relevant information about the organization. The use of an interwoven graphic design, such as a tartan, may help distinguish one particular red and gray shirt from another, but if the basis for the design is subjective with no direct or indirect connection to any objective qualities about the organization, its utility is limited to conveying only subjective qualities about the organization it is intended to represent. Even then, there may be a significant economic cost in order to promulgate an association between a particular interwoven graphic design and the particular organization it is intended to represent.

In general, there is an inverse correlation between the amount of alphanumeric characters used in a graphic design and its suitability for use in apparel certain settings; in general, more graphics are less suitable for formal settings. For example, that aforementioned red and gray shirt emblazoned with "Ohio State University founded in Columbus, Ohio in 1870" may be perfectly suitable for casual settings like a college dorm room but not for a professional meeting outside the university. Likewise, a red and gray tie with a simple "O" and buckeye logo might be suitable for a semi-formal gathering of fellow alumni but generally less suitable for a formal event such as a wedding, funeral, or professional meeting involving individuals without the same common association with the organization. The use of graphic designs in apparel or other articles associated with an organization are usually limited to settings that are either casual settings (e.g. sporting events) or where a large number of people associated with the organization are convened and also wearing similar apparel (e.g. alumni gatherings). Although the innate emotional affection that most people feel for their organization does not change, the situations in which their choice of apparel associated with the organization may need to change depending upon the formality or informality of the setting. For people who wish to express their affiliation for a particular organization in any setting, a need exists for apparel and other articles of manufacture that incorporate unique graphic designs based on objective identifiable information derived from the particular organization. Such a graphic design would need to be uniquely associated with the organization and rendered in a subtle and meaningful way that would be relevant or recognizable only to others affiliated with the organization.

The present disclosure describes examples of encoding information elements, such as the objective identifiable information discussed above, in tartan designs. The information elements can thereby influence the tartan design. A tartan design generally specifies one or more tartan patterns that each include crisscrossed horizontal and vertical bands in multiple colors, where each pattern can be defined by a set of coordinates in association with two or more colors. In various embodiments, the tartan design can include, for example, a primary, pattern and a secondary pattern. In certain embodiments, tartan designs can be defined by or associated with machine instructions that are usable to create corresponding tartans using woven wool or other similar materials (where the bands may be represented using colored threads) or as a printed design (where the bands may be represented using colored lines).

Advantageously, in certain embodiments, tartans created as described herein can serve several competing objectives which are traditionally in tension relative to each other. For example, in various embodiments, the tartans can provide utility as apparel or another article of manufacture. By way of further example, the tartans can serve an informational purpose so as to convey or encode information in a way that can be decoded. Additionally, or alternatively, the tartans can use colors, for example, to associate a particular tartan design with an individual or organization. In general, the tartans described herein can include informational, associational, and aesthetic qualities while conforming to traditional tartan design standards.

FIG. 1 illustrates an example of a computing environment 100 for encoding and decoding tartans. The computing environment 100 includes a tartan encoding/decoding system 102, user system(s) 116, and textile system(s) 118 that are each operable to communicate over a network 114. The network 114 may be or include a private network, a public network, a local or wide area network, a portion of the Internet, combinations of the same, and/or the like. The tartan encoding/decoding system 102 includes a tartan encoder 104, a tartan imaging engine 106, a tartan decoder 108, a user interface module 110, and data store(s) 112.

The data store(s) 112 can include any information used or generated by a component of the tartan encoding/decoding system 102. In an example, the data store(s) 112 can include tartan templates that vary design parameters. In various embodiments, each tartan template can specify variables for types of information that can be encoded, configuration settings for how to encode and decode the specified types of information, as well as design settings for particular types of tartan designs. For example, in various embodiments, the configuration settings of a tartan template can specify pattern shape (e.g., square versus rectangular), type of article of manufacture (e.g., tie, shirt, blanket, etc.), a number of times that a design should repeat itself, a dimension such as a width or length within which a design should repeat itself, an angle of expression (e.g., in degrees), a thread type or thread width (if threads are used to create bands), combinations of the foregoing and/or the like.

The tartan encoder 104 can generate a tartan design using a combination of configurable information elements such as the objective information discussed above. In some cases, the tartan encoder 104 can use the tartan templates in the data store(s) 112 to drive the generation. In various embodiments, the generated tartan design can be defined by or associated with a machine instruction set for creating a tartan. In various embodiments, the machine instruction set can include band-level detail for a primary pattern and a secondary pattern, inclusive of colors and band count (e.g., thread count). In certain embodiments, the machine instruction set can be sent to one or more of the textile system(s) 118 for computer-aided and/or user-guided weaving of a corresponding tartan using, for example, wool or other materials. The tartan imaging engine 106 can generate and/or render a tartan design as an image for presentation to a user.

In general, for any tartan that is created using a tartan design generated by the tartan encoder 104, the tartan decoder 108 can derive the information elements on which the tartan design is based. Although the tartan decoder 108 is illustrated as residing on the tartan encoding/decoding system 102, in certain embodiments, the tartan decoder 108 can reside on and execute from the user systems(s) 116. In addition, or alternatively, the tartan decoder 108 can reside on both the tartan encoding/decoding system 102 and the user system 116 and have its functionality distributed between the two. Example operation of the tartan encoder 104, the tartan imaging engine 106, and the tartan decoder 108 will be described in greater detail with respect to FIGS. 3-6.

The user interface module 110 can serve an interface or dashboard to users, for example, of the user system(s) 116, for purposes of triggering or interacting with the tartan encoder 104, the tartan imaging engine 106, and/or the tartan decoder 108. The user system(s) 116 can be a computer system usable to access the tartan encoding/decoding system 102. The user system(s) 116 can be a computer system such as a smartphone, a wearable or body-borne computer, a desktop computer, a laptop computer, a tablet computer, a personal digital assistant (PDA), combinations of same and/or the like. In certain embodiments, the user system(s) 116 is an example of a computer system that can be used to administer the computing environment 100. For example, in various embodiments, the user system(s) 116 can access a web interface, an application programming interface (API) or other interface of the tartan encoding/decoding system 102 for purposes of triggering, for example, encoding functionality of the tartan encoder 104 and/or decoding functionality of the tartan decoder 108.

Figure 2:
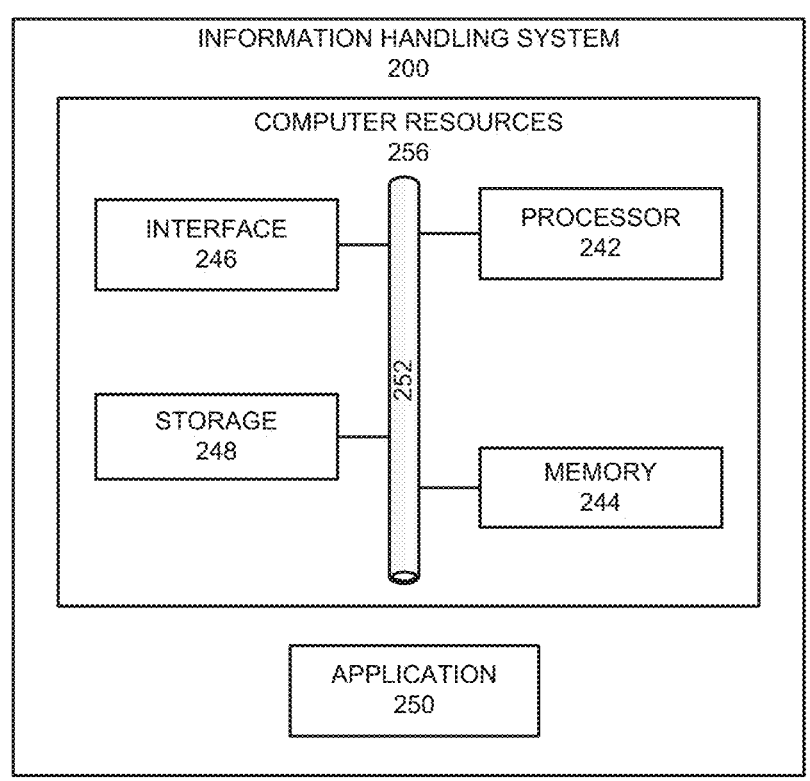
FIG. 2 illustrates an example of a computer system.

FIG. 2 illustrates an example of a computer system 200 that, in some cases, can be representative, for example, of the tartan encoding/decoding system 102, the user system(s) 116, and/or the textile system(s) 118. The computer system 200 includes an application 250 operable to execute on computer resources 256. The application 250 can be similar, for example, to the tartan encoder 104, the tartan imaging engine 106, the tartan decoder 108, or the user interface module 110. In particular embodiments, the computer system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 200 may comprise any suitable physical form, configuration, number, type and/or layout. As an example, and not by way of limitation, the computer system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 200 may include one or more computer systems; be unitary or distributed; span multiple locations; span multiple machines; or reside in a cloud, which may include one or more cloud components in one or more networks.

In the depicted embodiment, the computer system 200 includes a processor 242, memory 244, storage 248, interface 246, and bus 252. Although a particular computer system is depicted having a particular number of particular components in a particular arrangement, this disclosure contemplates any suitable computer system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the application 250. Such functionality may include providing various features discussed herein. In particular embodiments, processor 242 may include hardware for executing instructions, such as those making up the application 250. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the computer system 200, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the computer system 200 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDI)), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the computer system 200, where appropriate. In particular embodiments, storage 248 may be non-volatile, solid-state memory. In particular embodiments, storage 248 may include read-only memory (ROM). Where appropriate, this ROM may be mask-programmed. ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) less adapter for communicating with a wireless network.

Depending on the embodiment, interface 246 may be any type of interface suitable for any type of network for which computer system 200 is used. As an example and not by way of limitation, computer system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 can include (or communicate with) a wireless PAN (WPAN) (such as, for example, a BLUETOOTH WPAN), a network, a WI-MAX network, an LTE network, an LTE-A network, a cellular telephone network (such as, for example, a Global System for Mobile Communications (GSM) network), or any other suitable wireless network or a combination of two or more of these. The computer system 200 may include any suitable interface 246 for any one or more of these networks, where appropriate.

In some embodiments, interface 246 may include one or more interfaces for one or more I/O devices. One or more of these I/O devices may enable communication between a person and the computer system 200. As an example and not by way of limitation, an I/O device may include a keyboard, keypad, microphone, monitor, mouse, printer, scanner, speaker, still camera, stylus, tablet, touchscreen, trackball, video camera, another suitable UO device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the computer system 200 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by, way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C. Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
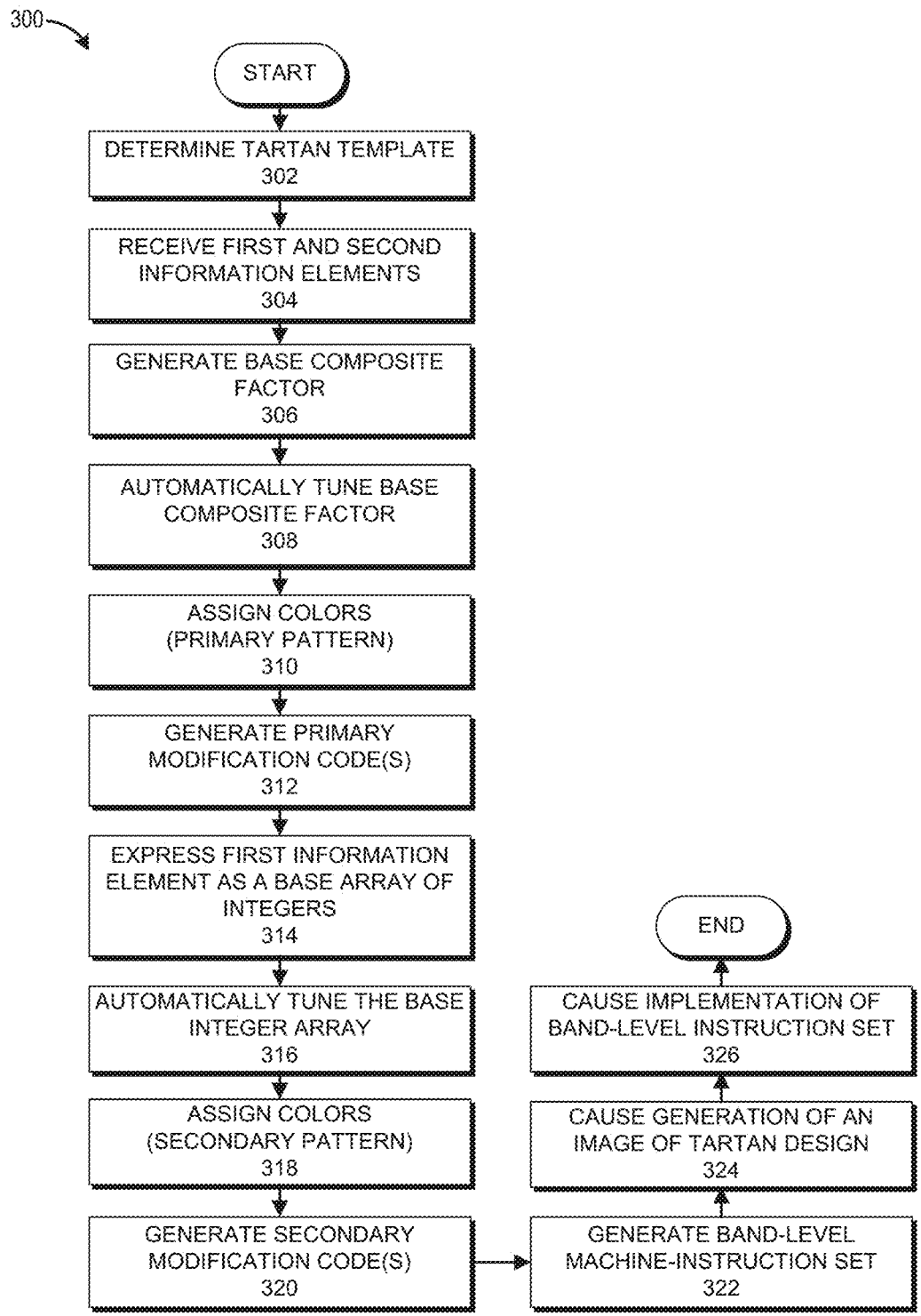
FIG. 3 illustrates an example of a process for tartan encoding and generation involving two information elements.

FIG. 3 illustrates an example of a process 300 for tartan encoding and generation involving two information elements. The process 300 can be implemented by any, system that can process data. In some cases, the process 300 can be performed generally by the tartan encoding/decoding system 102 or the computing environment 100 of FIG. 1. Although the process 300 can be performed by any number of computer systems or components, the process 300 will be described relative to particular components of the tartan encoding/decoding system 102 of FIG. 1.

At block 302, responsive to a trigger, the tartan encoder 104 determines a tartan template from the data store(s) 112 to use for tartan generation. The trigger for the block 302 can be received via one of the user system(s) 116, for example. In general, the block 302 can include using a default tartan template or a template received or specified by the user system(s) 116. The tartan template can define or specify parameters for a primary tartan pattern and a secondary tartan pattern.

At block 304, the tartan encoder 104 receives first and second information elements for use in generating a tartan design. The first and second information elements can be, for example, objective information of the type described above. In various embodiments, the first and second information elements can be received from the user system(s) 116. For illustrative purposes, two running examples will be described relative to an organizational tartan, where the first information element is a year of founding of the organization and the second information element is a geo-locator for the organization. The first running example corresponds to a rectangle-based tartan with the example information elements shown in Table 1. The second running example corresponds to a square-based tartan with the example information elements shown in Table 2.

TABLE 1

Example Information Elements for a Rectangle-Based Tartan Design

| 1 | Year | | 1891 |
|---|---|---|---|
| 2 | Geo-Locator: | | |
| | | Latitude | 39.956 |
| | | Longitude | 75.189 |

TABLE 2

Example Information Elements for a Square-Based Tartan Design

| 1 | Year | | 1891 |
|---|---|---|---|
| 2 | Geo-Locator | | |
| | | Postal Code | 19104 |

Blocks 306-312 generally describe generation of a primary tartan pattern for the tartan design. At block 306, the tartan encoder 104 generates base composite factor(s) for the first and second information elements. Each base composite factor can be a value that is derived from the first and second information elements. Continuing the first running example using the example information elements shown in Table 1 for a rectangle-based tartan design, as shown in Table 3 below, the first information element can be divided by each of the latitude value and the longitude value to yield two base composite factors of approximately 47.33 and 25.15, respectively. Continuing the second running example using the example information elements shown in Table 2 for a square-based tartan design, as shown in Table 4 below, the postal code can be divided by the first information element to yield a single composite factor of approximately 10.10. In some embodiments, such as when the first and second information elements are not numerical values, the block 306 can include converting such elements to numerical representations prior to performing the divisions (e.g., character-by-character conversions to corresponding integer codes).

TABLE 3

Example Base Composite Factors for a Rectangle-Based Tartan Design

| First Base Composite Factor (Year/Latitude) | 47.33 |
|---|---|
| Second Base Composite Factor (Year/Longitude) | 25.15 |

TABLE 4

Example Base Composite Factor for a Square-Based Tartan Design

| Single Base Composite Factor (Postal Code/Year) | 10.10 |
|---|---|

At block 308, the tartan encoder 104 automatically tunes the base composite factor(s), for example, for optimal loom compatibility, to yield two tuned composite factors that correspond to a band or thread count. For example, in certain embodiments, the block 308 can involve rounding each base composite factor up (or down) to the nearest even-numbered integer. In the first running example for a rectangle-based tartan design, the first and second base composite factors can be rounded up to the nearest even-numbered integer as shown in Table 5 below. In the second running example for a square-based tartan design, the single base composite factor can be rounded up to the nearest even-numbered integer and used as both the first and second tuned composite factors as shown in Table 6 below. It should be appreciated that the base composite factor(s) can be tuned using any suitable fashion such as, for example, by applying any rule or any mathematical function or operation to the base composite factor(s).

In some embodiments, the block 308 can further include scaling up or scaling down the tuned composite factors in accordance with a scaling factor that can be specified in the tartan template. For example, if an article is particularly small (e.g., a tie) and the primary pattern would not repeat itself a minimum number of times (e.g., one repeat for two complete appearances in the article), a fractional scaling factor such as, for example, one half, can be applied to the tuned composite factors until the minimum number of repeats is achieved. Conversely, if the article is particularly large (e.g., a blanket) and the primary pattern would repeat itself in excess of a maximum number of times, a scaling factor such as, for example, two, can be applied to the tuned composite factors until a number of design repeats is no longer in excess of the maximum number of repeats. For simplicity of description, no scaling factors are utilized in the running examples described herein,

TABLE 5

Example Tuned Composite Factors for a Rectangle-Based Tartan Design

| | |
|---|---|
| First Tuned Composite Factor—X | 48 |
| Second Tuned Composite Factor—Y | 26 |

TABLE 6

Example Tuned Composite Factors for a Square-Based Tartan Design

| | |
|---|---|
| First Tuned Composite Factor—X | 12 |
| Second Tuned Composite Factor—Y | 12 |

At block 310, the tartan encoder 104 assigns a color to each tuned composite factor. In both running examples, a specific color can be assigned to each of X and Y. In some cases, the colors can be supplied, for example, by a user of the user system(s) 116. In addition, or alternatively, the colors can be supplied by the tartan template or other settings. In various embodiments, the color assignments can correspond, for example, to colors closely associated with the organization to which the tartan design relates. In various cases, the colors can be prioritized by dominance, such that a most dominant color, for example, is assigned to the tuned composite factor corresponding to the highest band count.

At block 312, the tartan encoder 104 generates primary modification code(s). In certain embodiments, the primary modification code(s) can correspond to a difference between each tuned composite factor and its corresponding base composite factor. It should be noted that, in the case of a square-based design, a single primary modification code can suffice since the tuned composite factors of a square-based tartan design are identical. Specifically, in the first running example for a rectangle-based tartan, two primary modification codes can result as shown in Table 7 below. In the second running example for a square-based tartan, a single primary modification code can result as shown in Table 8 below. In various embodiments, a combination of the tuned composite factors and the color assignments can constitute the primary tartan pattern, with the primary modification code(s) supporting decoding efforts as will be described in greater detail relative to FIG. 4.

TABLE 7

Example Primary Modification Codes for a Rectangle-Based Tartan Design

| | |
|---|---|
| First Primary Modification Code | 0.673 |
| Second Primary Modification Code | 0.850 |

TABLE 8

Example Primary Modification Code for a Square-Based Tartan Design

| | |
|---|---|
| Primary Modification Code | 1.90 |

Blocks 314-320 generally describe generation of a secondary tartan pattern for the tartan design. At block 314, the tartan encoder 104 expresses the first information element (from the block 304) as a base array of integers. For purposes of both running examples, the first information element is a four-digit year. In these examples, the four-digit year can be expressed as a base array of four integers according to place value as shown in Table 9 (i.e., 1, 8, 9, and 1).

TABLE 9

Example Base Array of Integers for Both Rectangle and Square-Based Tartan Design

| Millennium | Century | Decade | Year |
|---|---|---|---|
| 1 | 8 | 9 | 1 |

At block 316, the tartan encoder 104 automatically tunes the base integer array, for example, for optimal loom compatibility, to yield a tuned integer array, where each tuned integer corresponds to a band or thread count. For example, in certain embodiments, the block 316 can involve rounding each non-even integer in the base integer array up (or down) to the nearest even-numbered integer. In some implementations, a scaling factor can be applied in the fashion described relative to the block 308. However, for simplicity of description, no scaling factor is applied in the running examples described herein. In both running examples, the four integers in the base array of integers can be tuned to yield the tuned integer array shown in Table 10 below.

TABLE 10

Example Tuned Array of Integers for Both Rectangle and Square-Based Tartan Design

| | | | |
|---|---|---|---|
| 2 | 8 | 10 | 2 |

At block 318, the tartan encoder 104 assigns a color to each integer in the tuned array. In some cases, the colors can be supplied, for example, by a user of the user system(s) 116. In addition, or alternatively, the colors can be supplied by the tartan template or other settings. In various embodiments, the color assignments can correspond, for example, to colors closely associated with the organization to which the tartan design relates. In various cases, the colors can be prioritized by dominance, such that a most dominant color, for example, is assigned to the tuned integer corresponding to the highest band count.

At block 320, the tartan encoder 104 generates secondary modification code(s). In certain embodiments, the secondary modification code(s) can correspond to a difference between each tuned integer in the tuned integer array and its corresponding base integer in the base integer array. Table 11 below illustrates example secondary modification codes for both of the running examples. In various embodiments, a combination of the tuned integer array and the color assignments can constitute the secondary tartan pattern, with the secondary modification code(s) supporting decoding efforts as will be described in greater detail relative to FIG. 4. In some embodiments, some or all parts of the secondary tartan pattern can be user-specified and/or user-modified. For example, in some embodiments, a user may specify or modify the tuned integer array and the color assignments, for example, in an effort to improve aesthetics.

TABLE 11

Example Secondary Modification Codes for Both Rectangle and Square-Based Design

| 1 | 0 | 1 | 1 |
|---|---|---|---|

At block 322, the tartan encoder 104 generates a band-level machine-instruction set for the tartan design. In various embodiments, the block 322 can include representing, for example, the primary tartan pattern, the secondary tartan pattern, the primary modification code(s), the secondary modification codes, information in the tartan template, and/or other information using a data structure. The foregoing information and/or other information can also be stored in the data store(s) 112.

At block 324, the tartan encoder 104 causes the tartan imaging engine 106 to generate an image of the tartan design using the hand-level machine instruction set. In some cases, the tartan encoder 104 can also cause the image to be presented, published, or made available to a user of the user system(s) 116 via, for example, the user interface module 110. In some cases, the image can be stored in the data store(s) 112 for later utilization.

At block 326, the tartan encoder 104 can cause implementation of the band-level machine-instruction set, for example, via transmission of the band-level machine instruction set to the textile system(s) 118, the user system(s) 116, or another system. In various embodiments, computer-aided and/or user-guided weaving can implement the band-level machine instruction set to create a tartan corresponding to the tartan design, in various embodiments, the primary modification code(s) and the secondary modification codes can be printed, for example, in a suitable location affixed or related to the tartan, such as on a tag. After block 326, the process 300 ends.

Figure 4:
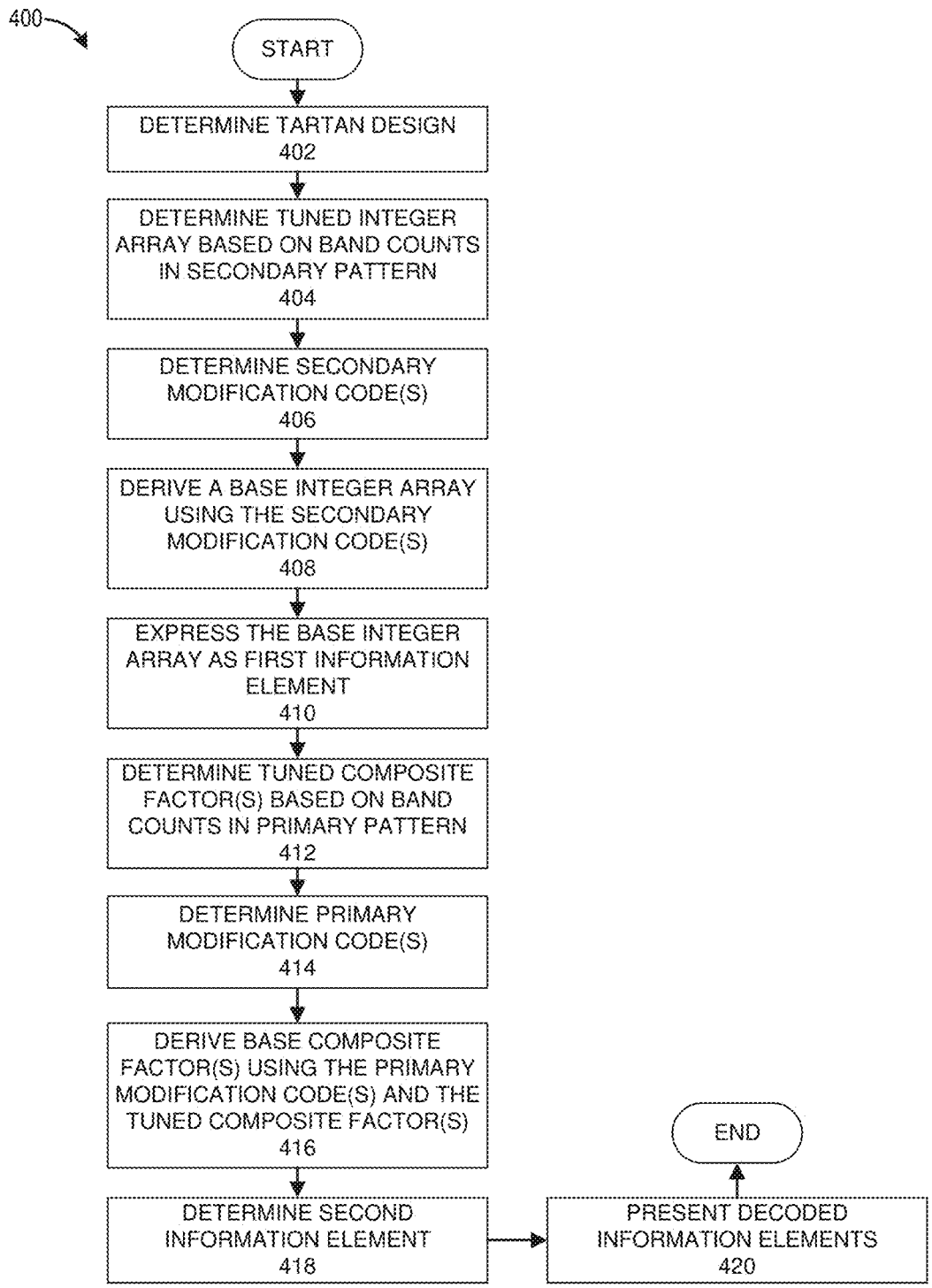
FIG. 4 illustrates an example of a process for decoding information encoded that has been encoded in tartan designs according to the example of FIG. 3.

FIG. 4 illustrates an example of a process 400 for decoding information encoded that has been encoded tartan designs according to the example of FIG. 3. The process 400 can be implemented by any system that can process data. In some cases, the process 400 can be performed generally by the tartan encoding/decoding system 102 or the computing environment 100 of FIG. 1. Although the process 400 can be performed by any number of computer systems or components, the process 400 will be described relative to particular components of the tartan encoding/decoding system 102 of FIG. 1.

At block 402, responsive to a trigger to decode a tartan, the tartan decoder 108 determines a type of tartan design to be decoded. In general, the type of tartan design to be decoded can correspond, for example, to a rectangle-based tartan, a square-based tartan, or another type of tartan. In some cases, the determined type of tartan design can relate to a particular tartan template in the data store(s) 112. The trigger for the block 402 can be received via one of the user system(s) 116, for example, in the form of a request to decode. In some embodiments, the block 402 can include receiving a user image of the tartan and performing image recognition to determine the corresponding tartan template. In some cases, the block 402 can include determining a default tartan template or a using template received or specified by the user system(s) 116.

At block 404, the tartan decoder 108 determines a tuned integer array based on band counts in a secondary pattern in the tartan design to be decoded. In certain embodiments, the tartan decoder 108 can use image recognition to recognize a primary pattern and a secondary pattern in the tartan design, and then automatically count bands of each color in the secondary pattern. In other embodiments, the band counts can be supplied by the user system(s) 116 following manual counts, which counts the tartan decoder transforms into the tuned integer array. For illustrative purposes, the process 400 will be described relative to the same two running examples as was used above relative to FIG. 3, where the first running example corresponds to a rectangle-based tartan and the second running example corresponds to a square-based tartan. For both running examples, the block 404 can result in the information shown in Table 10 above.

At block 406, the tartan decoder 108 determines secondary modification code(s) for the tartan. In certain embodiments, the secondary modification code(s) can be supplied by the user system(s) 116 based on user review, for example, of a tag or other article affixed to the tartan. In other cases, the secondary modification code(s) can be extracted, for example, from an image of the tag or other article affixed to the tartan. According to both running examples, the secondary modification code(s) can correspond to the information shown in Table 11 above.

At block 408, the tartan decoder 108 derives a base integer array using the secondary modification code(s) from the block 406 and the tuned integer array from the block 404. In certain embodiments, the block 408 can include subtracting each secondary modification code from its corresponding integer in the tuned integer array. In some embodiments, the block 408 can further include reversing any scaling factor that may be specified in the tartan template, for example, by dividing each subtraction result by the scaling factor. For simplicity of description, no scaling factors are used in the running examples described herein. Therefore, according to both running examples, as a result of the aforementioned subtraction, the block 408 can result in the base integer array shown in Table 9 above.

At block 410, the tartan decoder 108 expresses the base integer array as a first information element. In some embodiments, expression can involve putting each integer in its appropriate place value to form a multi-digit integer. For example, in both running examples, the first information element is the year of founding of the organization and can be recreated by, restoring each integer in the base integer array to its place value in a representation of a year, namely, 1891.

At block 412, the tartan decoder 108 determines tuned composite factor(s) based on band counts in the primary pattern in the tartan design to be decoded. In certain embodiments, the tartan decoder 108 can use image recognition to recognize the primary pattern and the secondary pattern in the tartan design, and then automatically count bands of each color in the primary pattern. In other embodiments, the band counts can be supplied by the user system(s) 116 following manual counts, which counts the tartan decoder transforms into the tuned composite factors. For the first running example of a rectangle-based tartan design, the first and second tuned composite factors shown in Table 5 above can be determined at the block 412. For the second running example of a square-based tartan design, the first and second tuned composite factors shown in Table 6 above can be determined at the block 412.

At block 414, the tartan decoder 108 determines primary modification code(s). In certain embodiments, the primary modification code(s) can be supplied by the user system(s) 116 based on user review, for example, of a tag or other article affixed to the tartan. In other cases, the primary modification code(s) can be extracted, for example, from an image of the tag or other article affixed to the tartan. For the first running example of a rectangle-based tartan design, first and second primary modification codes can be determined according to the information shown in Table 7 above. For the second running example of a square-based tartan design, a single primary modification code can be determined according to the information shown in Table 8 above.

At block 416, the tartan decoder 108 derives base composite factor(s) using the primary modification code(s) from the block 414 and the tuned composite factor(s) from the block 412. In certain embodiments, the block 416 can include subtracting each primary modification code from its corresponding tuned composite factor. In some embodiments, the block 416 can further include reversing any scaling factor that may be specified in the tartan template, for example, by dividing each subtraction result by the scaling factor. For simplicity of description, no scaling factors are used in the running examples described herein. Therefore, for the first running example of a rectangle-based tartan design, first and second base composite factors can be determined according to the information shown in Table 3 above. For the second running example of a square-based tartan design, a single base composite factor can be determined according to the information shown in Table 4 above.

At block 418, the tartan decoder 108 determines a second information element using the base composite factor(s) from the block 416 and the first information element from the block 410. For example, in various embodiments, the block 418 can include the tartan decoder 108 using a predetermined decoding method specified in a tartan template for the type of tartan design. For the first running example of a rectangle-based tartan design, the second information element can be determined h dividing the first information element by each of the first base composite factor and the second base composite factor to yield the latitude and longitude values shown in Table 1 above. For the second running example of a square-based tartan design, the second information element can be determined by multiplying the first information element by the single base composite factor to yield the postal code shown in Table 2 above.

At block 420, decoded information elements are presented, for example, to a user of the user system(s) 116. The decoded information can include, for example, the first and second information elements described above. In some cases, the decoded information can be presented or made available to the user via the user interface module 110. In addition, or alternatively, the decoded information elements or information related thereto can be stored in the data store(s) 112. After block 420, the process 400 ends.

Figure 5:
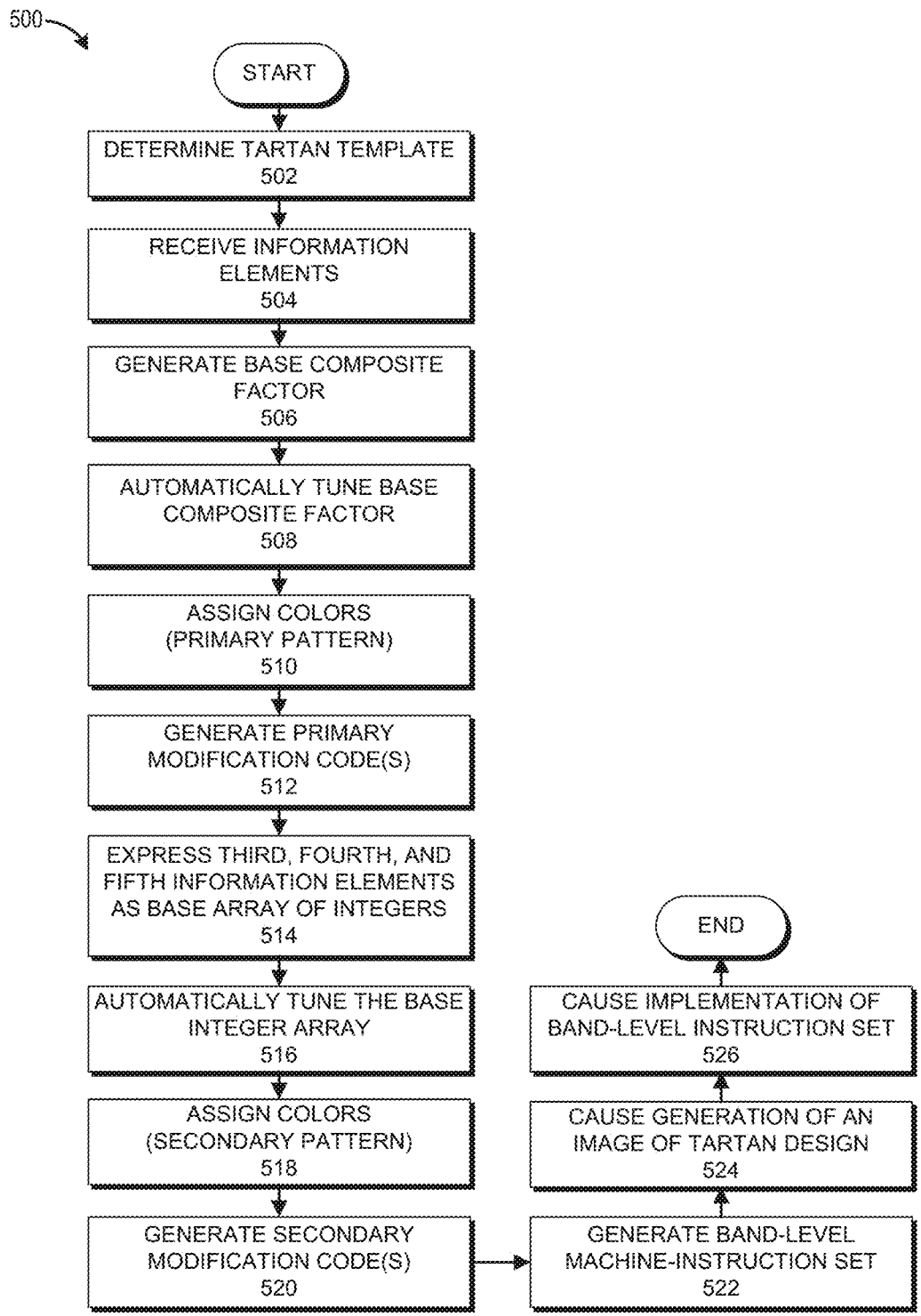
FIG. 5 illustrates an example of a process for tartan encoding and generation involving five information elements.

FIG. 5 illustrates an example of a process 500 for tartan encoding and generation involving five information elements. The process 500 can be implemented by any, system that can process data. In some cases, the process 500 can be performed generally by the tartan encoding/decoding system 102 or the computing environment 100 of FIG. 1. Although the process 500 can be performed by any number of computer systems or components, the process 500 will be described relative to particular components of the tartan encoding/decoding system 102 of FIG. 1.

At block 502, responsive to a trigger, the tartan encoder 104 determines a tartan template from the data store(s) 112 to use for tartan generation. The trigger for the block 502 can be received via one of the user system(s) 116, for example. In general, the block 502 can include using a default tartan template or a template received or specified by the user system(s) 116. The tartan template can define or specify parameters for a primary tartan pattern and a secondary tartan pattern.

At block 504, the tartan encoder 104 receives, for example, five information elements. The five information elements can be, for example, objective information of the type described above. In various embodiments, the five information elements can be received from the user system(s) 116. For illustrative purposes, two running examples will be described relative to a university tartan, where the first information element is a year of founding of the university, the second information element is a geo-locator for the university, the third information element is a number of schools in the university, the fourth information element is a number of sports teams at the university, and the fifth information element is a number of fraternities and sororities at the university. It should be appreciated that the principles described herein are not limited to these examples can be similarly applied to any other type of representable information. The first running example corresponds to a rectangle-based tartan with the example information elements shown in Table 12. The second running example corresponds to a square-based tartan with the example information elements shown in Table 13.

TABLE 12

Example Information Elements for a
Rectangle-Based Tartan Design

| | | |
|---|---|---|
| 1 | Year | 1891 |
| 2 | Geo-Locator: | |
| | Latitude | 39.956 |
| | Longitude | 75.189 |
| 3 | Number of Schools | 9 |
| 4 | Number of Sports Teams | 14 |
| 5 | Number of Sororities | 11 |

TABLE 13

Example Information Elements for a
Square-Based Tartan Design

| | | |
|---|---|---|
| 1 | Year | 1891 |
| 2 | Geo-Locator: | |
| | Postal Code | 19104 |
| 3 | Number of Schools | 9 |
| 4 | Number of Sports Teams | 14 |
| 5 | Number of Sororities | 11 |

Blocks 506-512 generally describe generation of a primary tartan pattern for the tartan design. In general, blocks 506-512 can be executed exactly as described relative to blocks 306-312 of the process 300 of FIG. 3, using the same first and second information elements. Thus, following block 512, a combination of the tuned composite factors and the color assignments can constitute the primary tartan pattern, with the primary modification code(s) supporting decoding efforts. Table 14 summarizes example results of blocks 506-512 for the first running example of a rectangle-based tartan. Table 15 summarizes example results of blocks 506-512 for the second running example of a square-based tartan design.

TABLE 14

Example Summary for a Rectangle-Based Tartan Design

| | |
|---|---|
| First Tuned Composite Factor—X | 48 |
| Second Tuned Composite Factor—Y | 26 |
| First Primary Modification Code | 0.673 |
| Second Primary Modification Code | 0.850 |

TABLE 15

Example Summary for a Square-Based Tartan Design

| | |
|---|---|
| First Tuned Composite Factor—X | 12 |
| Second Tuned Composite Factor—Y | 12 |
| Primary Modification Code | 1.90 |

Blocks 514-520 generally describe generation of a secondary tartan pattern for the tartan design. At block 514, the tartan encoder 104 expresses the third, fourth, and fifth information elements as a base array of three integers. For purposes of both running examples, the third, fourth, and fifth information elements can be expressed as a base array of three integers according to Table 16.

TABLE 16

Example Base Array for Both Rectangle and Square-Based Tartan Design

| Schools | Sports Teams | Frat/Sor |
|---|---|---|
| 9 | 14 | 11 |

At block 516, the tartan encoder 104 automatically tunes the base integer array, for example, for optimal loom compatibility, to yield a tuned integer array, where each tuned integer corresponds to a band or thread count. For example, in certain embodiments, the block 516 can involving rounding each non-even integer in the base integer array up (or down) to the nearest even-numbered integer. In both running examples, the four integers in the base array of integers can be tuned to yield the tuned integer array shown in Table 17 below. As described previously, some implementations can further utilize scaling factors to ensure minimum or maximum numbers of pattern repeats are satisfied.

TABLE 17

Example Tuned Array for Both Rectangle and Square-Based Tartan Design

| 10 | 14 | 12 |
|---|---|---|

At block 518, the tartan encoder 104 assigns a color to each integer in the tuned array. In some cases, the colors can be supplied, for example, by a user of the user system(s) 116. In addition, or alternatively, the colors can be supplied by the tartan template or other settings. In various embodiments, the color assignments can correspond, for example, to colors closely associated with the organization to which the tartan design relates.

At block 520, the tartan encoder 104 generates secondary modification code(s). In certain embodiments, the secondary modification code(s) can correspond to a difference between each tuned integer in the tuned integer array and its corresponding base integer in the base integer array. Table 18 below illustrates example secondary modification codes for both of the running examples. In various embodiments, a combination of the tuned integer array and the color assignments can constitute the secondary tartan pattern, with the secondary modification code(s) supporting decoding efforts.

TABLE 18

Example Secondary Modification Codes for Both Rectangle and Square-Based Design

| 1 | 0 | 1 |
|---|---|---|

At block 522, the tartan encoder 104 generates a band-level machine-instruction set for the tartan design. In various embodiments, the block 522 can include representing, for example, the primary tartan pattern, the secondary tartan pattern, the primary modification code(s), the secondary modification codes, information in the tartan template, and/or other information using a data structure. The foregoing information and/or other information can also be stored in the data store(s) 112.

At block 524, the tartan encoder 104 causes the tartan imaging engine 106 to generate an image of the tartan design. In some cases, the tartan encoder 104 can also cause the image to be presented, published, or made available to a user of the user system(s) 116 via, for example, the user interface module 110. In some cases, the image can be stored in the data store(s) 112 for later utilization.

At block 526, the tartan encoder 104 can cause implementation of the band-level machine-instruction set, for example, via transmission of the band-level machine instruction set to the textile system(s) 118, the user system(s) 116, or another system. In various embodiments, computer-aided and/or user-guided weaving can implement the band-level machine instruction set to create a tartan corresponding to the tartan design. In various embodiments, the primary modification code(s), the secondary modification codes, and the first information element can be printed, for example, in a suitable location affixed or related to the tartan, such as on a tag. After block 526, the process 500 ends.

Figure 6:
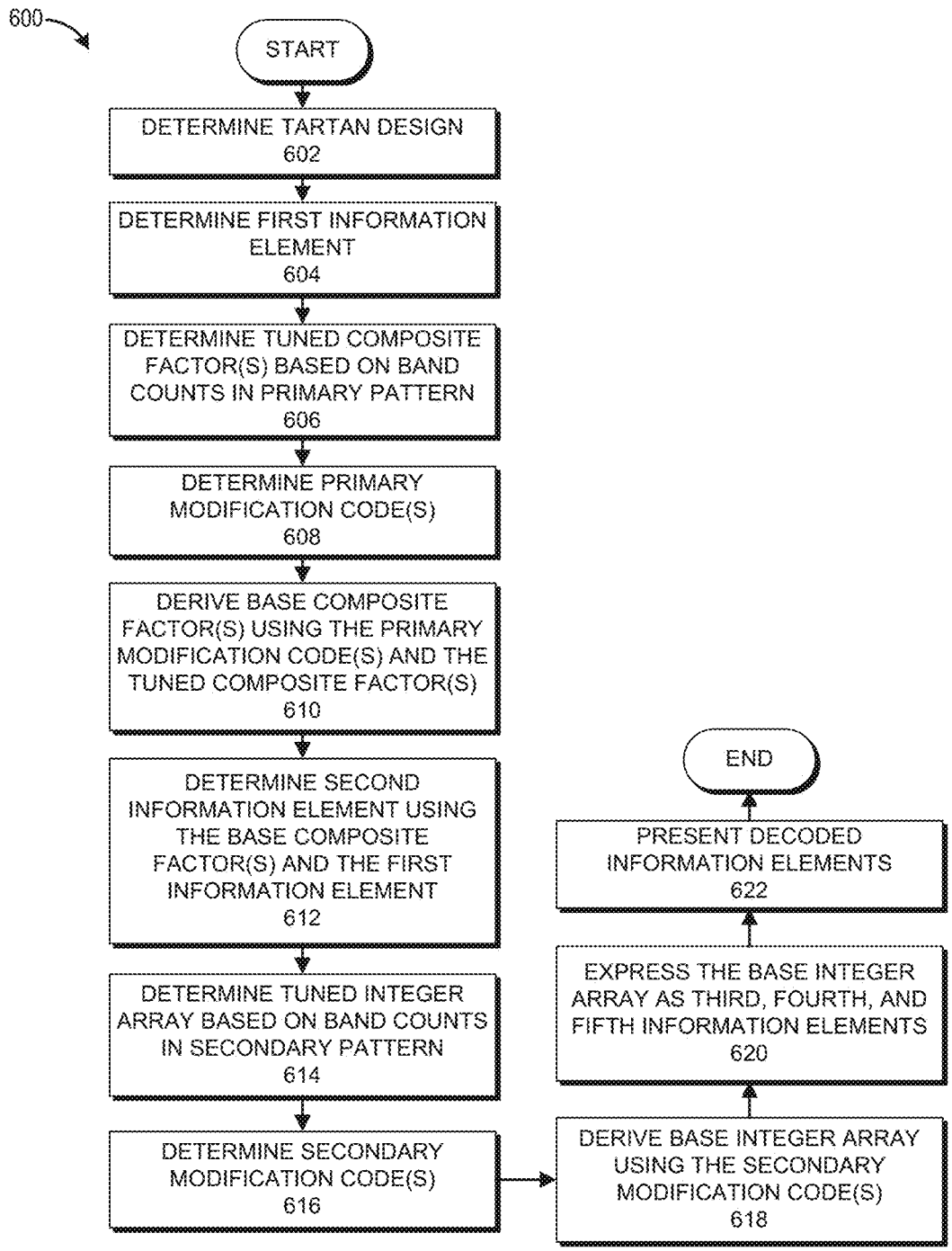
FIG. 6 illustrates an example of a process for decoding information encoded that has been encoded in tartan designs according to the example of FIG. 5.

FIG. 6 illustrates an example of a process 600 for decoding information encoded that has been encoded tartan designs according to the example of FIG. 5. The process 600 can be implemented by any system that can process data. In some cases, the process 600 can be performed generally by the tartan encoding/decoding system 102 or the computing environment 100 of FIG. 1, Although the process 600 can be performed by any number of computer systems or components, the process 600 will be described relative to particular components of the tartan encoding/decoding system 102 of FIG. 1.

At block 602, responsive to a trigger to decode a tartan, the tartan decoder 108 determines a type of tartan design to be decoded. In general, the type of tartan design to be decoded can correspond, for example, to a rectangle-based tartan, a square-based tartan, or another type of tartan. In some cases, the determined type of tartan design can relate to a particular tartan template in the data store(s) 112. The trigger for the block 602 can be received via one of the user system(s) 116, for example, in the form of a request to decode. In some embodiments, the block 602 can include receiving a user image of the tartan and performing image recognition to determine the corresponding tartan template. In some cases, the block 602 can include determining a default tartan template or a using template received or specified by the user system(s) 116.

At block 604, the tartan decoder 108 determines a first information element for the tartan. In certain embodiments, the first information element can be supplied by the user system(s) 116 based on user review, for example, of a tag or other article affixed to the tartan. In other cases, the first information element can be extracted, for example, from an image of the tag or other article affixed to the tartan. According to both running examples, the first information element can correspond to the year of founding of the university, namely, 1891.

At block 606, the tartan decoder 108 determines tuned composite factor(s) based on band counts in a primary pattern in the tartan design to be decoded. In certain embodiments, the tartan decoder 108 can use image recognition to recognize the primary pattern and a secondary pattern in the tartan design, and then automatically count bands of each color in the primary pattern. In other embodiments, the band counts can be supplied by the user system(s) 116 following manual counts, which counts the tartan decoder transforms into the tuned composite factors. For the first running example of a rectangle-based tartan design, the first and second tuned composite factors shown in Table 14 above can be determined at the block 606. For the second running example of a square-based tartan design, the first and second tuned composite factors shown in Table 15 above can be determined at the block 606.

At block 608, the tartan decoder 108 determines primary modification code(s). In certain embodiments, the primary modification code(s) can be supplied by the user system(s) 116 based on user review, for example, of a tag or other article affixed to the tartan. In other cases, the primary modification code(s) can be extracted, for example, from an image of the tag or other article affixed to the tartan. For the first running example of a rectangle-based tartan design, first and second primary modification codes can be determined according to the information shown in Table 14 above. For the second running example of a square-based tartan design, a single primary modification code can be determined according to the information shown in Table 15 above.

At block 610, the tartan decoder 108 derives base composite factor(s) using the primary modification code(s) from the block 608 and the tuned composite factor(s) from the block 606. In certain embodiments, the block 610 can include subtracting each primary modification code from its corresponding tuned composite factor. For the first finning example of a rectangle-based tartan design, first and second base composite factors can be determined according to the information shown in Table 3 above. For the second running example of a square-based tartan design, a single base composite factor can be determined according to the information shown in Table 4 above. As described previously, some implementations can further reverse any scaling factors which may have been applied to ensure that minimum or maximum numbers of pattern repeats are satisfied.

At block 612, the tartan decoder 108 determines a second information element using the base composite factor(s) from the block 610 and the first information element from the block 604. For example, in various embodiments, the block 612 can include the tartan decoder 108 using a predetermined decoding method specified in a tartan template for the type of tartan design. For the first running example of a rectangle-based tartan design, the second information element can be determined by dividing the first information element by each of the first base composite factor and the second base composite factor to yield the latitude and longitude values shown in Table 12 above. For the second running example of a square-based tartan design, the second information element can be determined by multiplying the first information element by the single base composite factor to yield the postal code shown in Table 13 above.

At block 614, the tartan decoder 108 determines a tuned integer array based on band counts in a secondary pattern in the tartan design to be decoded. In certain embodiments, the tartan decoder 108 can use image recognition to recognize a primary pattern and a secondary pattern in the tartan design, and then automatically count bands of each color in the secondary pattern. In other embodiments, the band counts can be supplied by the user system(s) 116 following manual counts, which counts the tartan decoder transforms into the tuned integer array.

At block 616, the tartan decoder 108 determines secondary modification code(s) for the tartan. In certain embodiments, the secondary modification code(s) can be supplied by the user system(s) 116 based on user review, for example, of a tag or other article affixed to the tartan. In other cases, the secondary modification code(s) can be extracted, for example, from an image of the tag or other article affixed to the tartan. According to both running examples, the secondary modification code(s) can correspond to the information shown in Table 1.8 above.

At block 618, the tartan decoder 108 derives a base integer array using the secondary modification code(s) from the block 616 and the tuned integer array from the block 614. In certain embodiments, the block 618 can include subtracting each secondary modification code from its corresponding integer in the tuned integer array. According to both running examples, the block 608 can result in the base integer array shown in Table 16 above. As described previously, some implementations can further reverse any scaling factors which may have been applied to ensure that minimum or maximum numbers of pattern repeats are satisfied.

At block 620, the tartan decoder 108 expresses the base integer array as the third, fourth, and fifth information elements. For example, in both running examples, the third, fourth, and fifth information elements correspond to the information shown as the third, fourth, and fifth information elements in Table 12 and Table 13.

At block 622, decoded information elements are presented, for example, to a user of the user system(s) 116. The decoded information can include, for example, the five information elements described above. In some cases, the decoded information can be presented or made available to the user via the user interface module 110. In addition, or alternatively, the decoded information elements or information related thereto can be stored in the data store(s) 112. After block 622, the process 600 ends.

Figure 7:
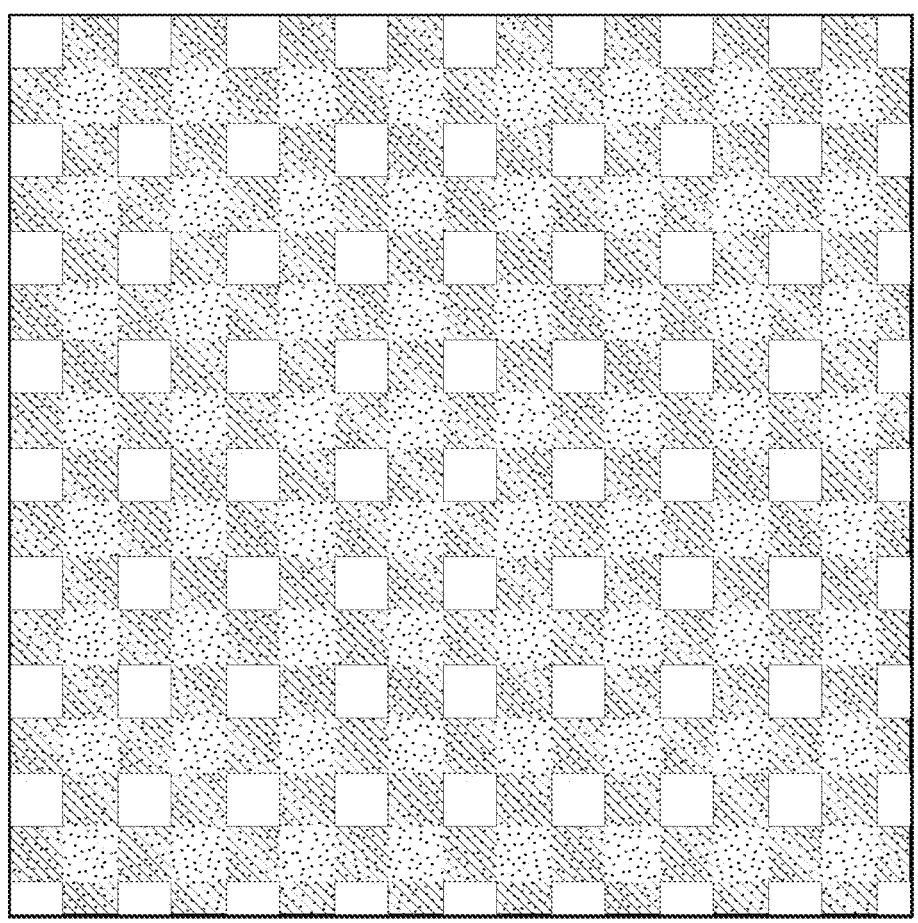
FIG. 7-11 illustrate example tartan patterns.

FIG. 7 illustrates an example of a tartan design that includes a primary tartan pattern. The primary tartan pattern can be generated, for example, as described relative to blocks 306-312 of the process 300 of FIG. 3. Lines in the primary tartan pattern can correspond to bands.

Figure 8:
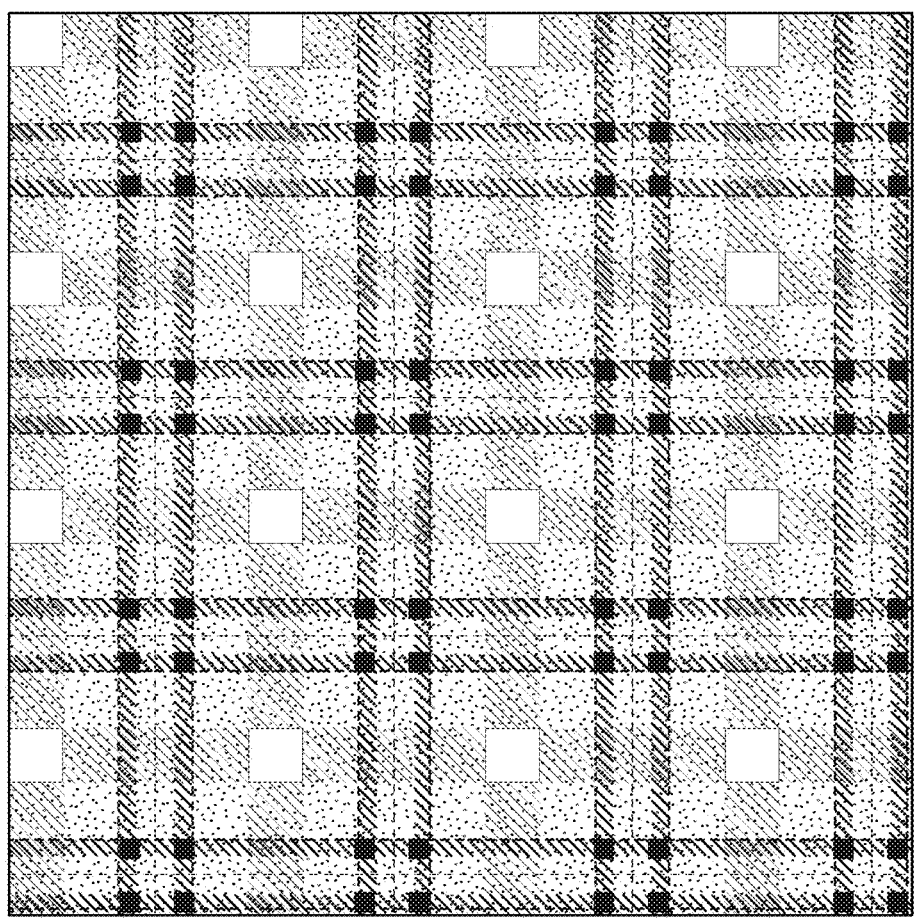

FIG. 8 illustrates an example of a tartan design that includes a primary tartan pattern and a secondary tartan pattern. For example, the secondary tartan pattern shown in FIG. 8 can be generated as described relative to blocks 314-320 of the process 300 of FIG. 3. Lines in the tartan design of FIG. 8 can correspond to bands.

Figure 9:
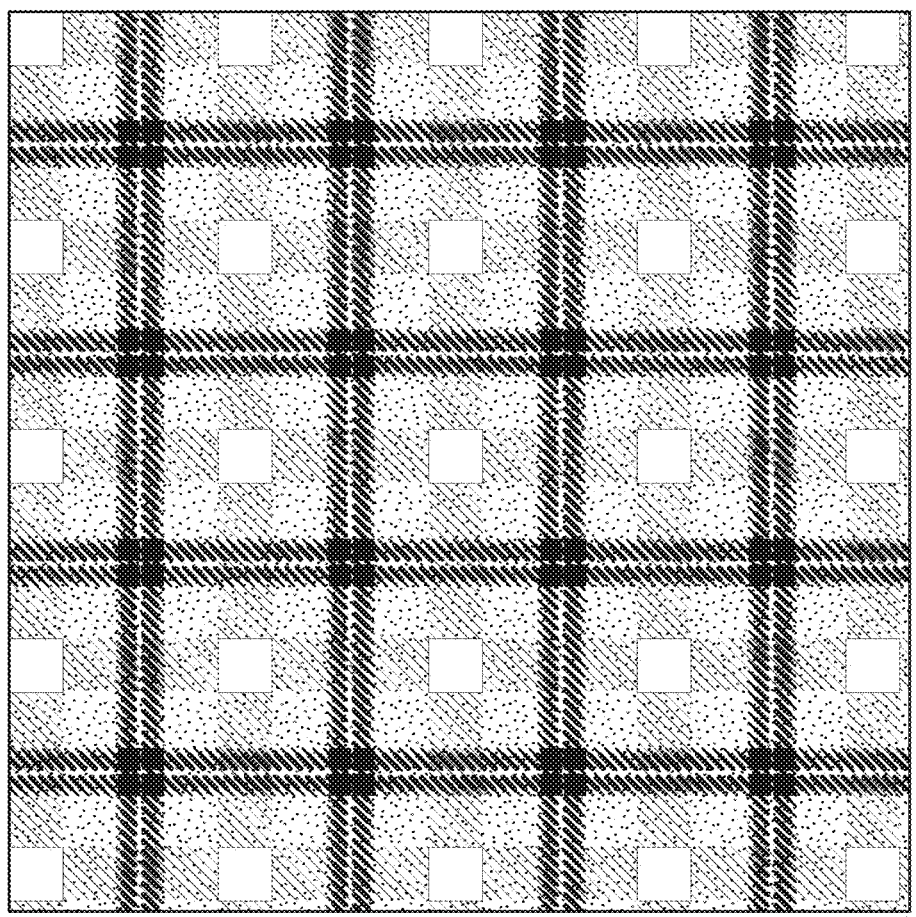

FIG. 9 illustrates an example of a tartan design that includes a primary tartan pattern and a secondary tartan pattern. The secondary tartan pattern can be generated, for example, as described relative to blocks 514-520 of the process 500 of FIG. 5. Lines in the tartan design of FIG. 9 can correspond to bands.

Figure 10:
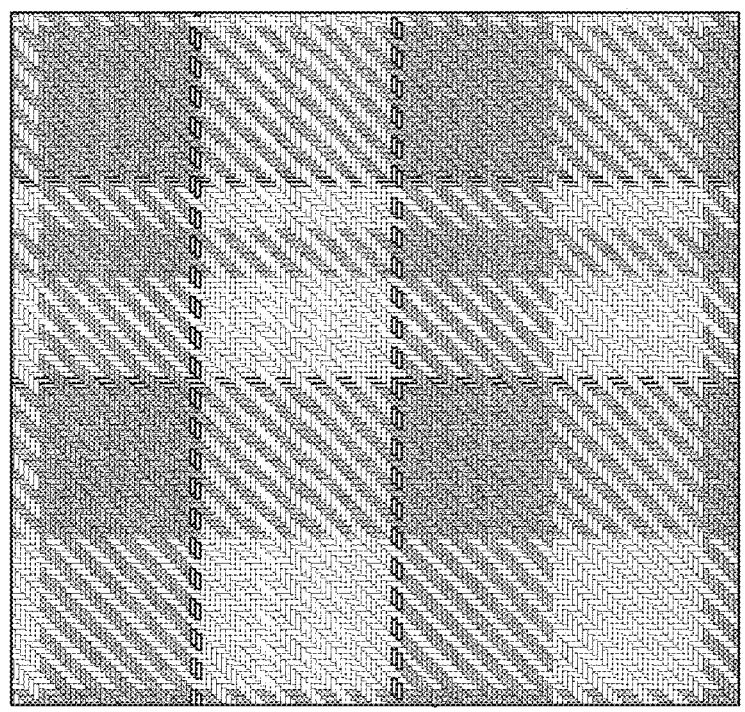

FIG. 10 illustrates a zoomed-in view of the tartan design of FIG. 8. The zoomed-in view can facilitate band counting as described, for example, relative to FIGS. 4 and 6.

Figure 11:
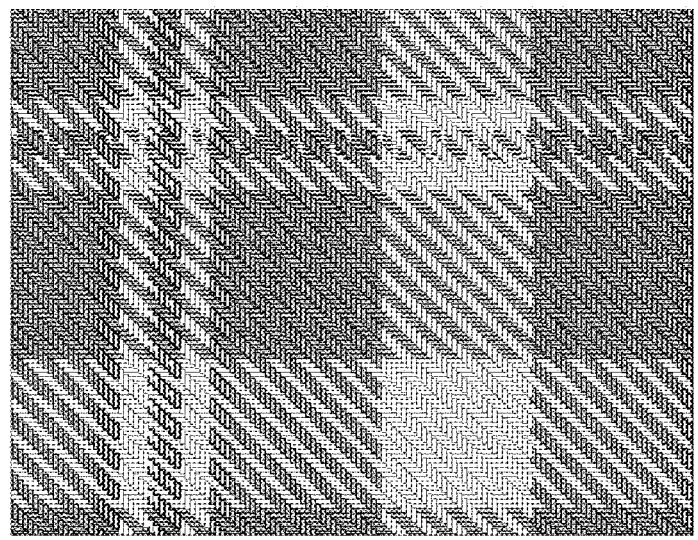

FIG. 11 illustrates a zoomed-in view of the tartan design of FIG. 9. The zoomed-in view can facilitate band counting as described, for example, relative to FIGS. 4 and 6.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of tartan encoding comprising, by a computer system:
   receiving first and second information elements for use in generating a tartan design;
   generating a primary pattern for the tartan design using the first and second information elements, the primary pattern including:
      a plurality of primary band counts that are each mathematically derived from a numerical composite of the first and second information elements; and
      a plurality of primary colors, the plurality of primary colors including a color for each of the plurality of primary band counts;
   generating a secondary pattern for the tartan design, the secondary pattern including:
      a plurality of secondary band counts; and
      a plurality of secondary colors, the plurality of secondary colors including a color for each of the plurality of secondary band counts; and
   generating a band-level machine instruction set for the tartan design, the band-level machine instruction set representing the primary pattern and the secondary pattern.

2. The method of claim 1, comprising the computer system generating an image of the tartan design using the band-level machine instruction set.

3. The method of claim 1, comprising causing implementation of the band-level machine instruction set via computer-aided weaving.

4. The method of claim 3, wherein the plurality of primary band counts and the plurality of secondary band counts correspond to thread counts for the computer-aided weaving.

5. The method of claim 1, wherein the tartan design is a rectangle-based tartan design, the generating the primary pattern comprising:
   deriving a first composite factor and a second composite factor from the first and second information elements;
   automatically tuning the first composite factor and second composite factor for loom compatibility, wherein the tuned first composite factor corresponds to a first band count of the plurality of primary band counts and the tuned second composite factor corresponds to a second band count of the plurality of primary band counts;
   assigning a first color to the tuned first composite factor and a second color to the tuned second composite factor, wherein the first color and the second color are included in the plurality of primary colors;
   generating a first modification code based on a difference between the tuned first composite factor and the first composite factor; and
   generating a second modification code based on a difference between the tuned second composite factor and the second composite factor.

6. The method of claim 5, wherein the automatically tuning comprises rounding the first composite factor and the second composite factor.

7. The method of claim 5, comprising scaling down the tuned first composite factor and the tuned second composite factor to a size of an article, the scaling down comprising applying a fractional scaling factor to the tuned first composite factor and the tuned second composite factor at least until a specified minimum number of repeats of the primary pattern within the size of the article is achieved.

8. The method of claim 6, wherein the automatically tuning comprises scaling up the tuned first composite factor and the tuned second composite factor to a size of an article, the scaling down comprising applying a scaling factor to the tuned first composite factor and the tuned second composite factor at least until a number of repeats of the primary pattern within the size of the article no longer exceeds a specified maximum number of repeats.

9. The method of claim 1, wherein the tartan design is a square-based tartan design, the generating the primary pattern comprising:
   deriving a composite factor from the first and second information elements;
   automatically tuning the composite factor for loom compatibility, wherein the tuned composite factor is used as both a first tuned composite factor and a second tuned composite factor, and wherein the first tuned composite factor corresponds to a first band count of the plurality of primary band counts and the second tuned composite factor corresponds to a second band count of the plurality of primary band counts;

assigning a first color to the first tuned composite factor and a second color to the second tuned composite factor, wherein the first color and the second color are included in the plurality of primary colors; and generating a modification code based on a difference between the tuned composite factor and the composite factor.

10. The method of claim 1, the generating the secondary pattern comprising:

expressing the first information element as a base array of integers;

automatically tuning the base array of integers for loom compatibility, wherein each integer in the tuned array of integers corresponds to a band count in the plurality of secondary band counts;

assigning a color to each integer in the tuned array of integers, wherein each assigned color is included in the plurality of secondary colors; and generating a plurality of modification codes for the tuned array of integers based, at least in part, on a difference between each integer in the tuned array and its corresponding integer in the base array.

11. The method of claim 1 comprising, responsive to a user request, decoding, by a device, the first information element and the second information element from a tartan including the tartan design.

12. The method of claim 11, the decoding comprising:
determining a type of the tartan design;
determining a tuned integer array based on band counts in the secondary pattern;
determining modification codes for the secondary pattern;
deriving a base integer array using the modification codes for the secondary pattern and the tuned integer array;
expressing the base integer array as the first information element;
determining tuned composite factors based on band counts in the primary pattern;
determining modification codes for the primary pattern;
deriving base composite factors using the modification codes for the primary pattern and the tuned composite factors; and
determining the second information element using the base composite factors and the first information element.

13. The method of claim 12 comprising, by the device:
receiving a user image of the tartan;
recognizing the primary pattern and the secondary pattern in the user image;
wherein determining the tuned integer array comprises automatically counting bands of each color in the recognized secondary pattern; and
wherein determining the tuned composite factors comprises automatically counting bands of each color in the recognized primary pattern.

14. The method of claim 12, wherein:
determining the tuned integer array comprises:
receiving, from a user system, the band counts in the secondary pattern; and
transforming the band counts into the tuned integer array;
determining the tuned composite factors comprises:
receiving, from the user system, the band counts in the primary pattern; and
transforming the band counts in the primary pattern into the tuned composite factors; and the modification codes for the primary pattern and the modification codes for the secondary pattern are received from the user system.

15. The method of claim 1, comprising:
wherein the receiving comprises receiving first, second, third, fourth and fifth information elements for encoding in the tartan design; and
responsive to a user request, decoding, by a device, at least the second, third, fourth and fifth information elements from a tartan including the tartan design.

16. The method claim 15, wherein generating the secondary pattern for the tartan design comprises:
expressing the third, fourth, and fifth information elements as a base array of integers;
automatically tuning the base array of integers for loom compatibility, wherein each integer in the tuned array of integers corresponds to a band count in the plurality of secondary band counts;
assigning a color to each integer in the tuned array of integers, wherein each assigned color is included in the plurality of secondary colors; and
generating a plurality of modification codes for the tuned array of integers based, at least in part, on a difference between each integer in the tuned array and its corresponding integer in the base array.

17. The method of claim 15 comprising, wherein the decoding comprises:
determining a type of the tartan design;
determining the first information element;
determining tuned composite factors based on band counts in the primary pattern;
determining modification codes for the primary pattern;
deriving base composite factors using the modification codes for the primary pattern and the tuned composite factors; and
determining the second information element using the base composite factors and the first information element;
determining a tuned integer array based on band counts in the secondary pattern;
determining modification codes for the secondary pattern;
deriving a base integer array using the modification codes for the secondary pattern and the tuned integer array; and
expressing the base integer array as the third, fourth and fifth information elements.

18. The method of claim 1, wherein the plurality of secondary band counts and the plurality of secondary colors are user-specified.

19. A system comprising a processor and memory, wherein the processor and memory in combination are operable to implement a method comprising:
receiving first and second information elements for use in generating a tartan design;
generating a primary pattern for the tartan design using the first and second information elements, the primary pattern including:
a plurality of primary band counts that are each mathematically derived from a numerical composite of the first and second information elements; and
a plurality of primary colors, the plurality of primary colors including a color for each of the plurality of primary band counts;

generating a secondary pattern for the tartan design, the secondary pattern including:
a plurality of secondary band counts; and
a plurality of secondary colors, the plurality of secondary colors including a color for each of the plurality of secondary band counts; and
generating a band-level machine instruction set for the tartan design, the band-level machine instruction set representing the primary pattern and the secondary pattern.

20. A computer-program product comprising a non-transitory computer-usable medium having computer-readable program code embodied therein, the computer-readable program code adapted to be executed to implement a method comprising:
receiving first and second information elements for use in generating a tartan design;
generating a primary pattern for the tartan design using the first and second information elements, the primary pattern including:
a plurality of primary band counts that are each mathematically derived from a numerical composite of the first and second information elements; and
a plurality of primary colors, the plurality of primary colors including a color for each of the plurality of primary band counts;
generating a secondary pattern for the tartan design, the secondary pattern including:
a plurality of secondary band counts; and
a plurality of secondary colors, the plurality of secondary colors including a color for each of the plurality of secondary band counts; and
generating a band-level machine instruction set for the tartan design, the band-level machine instruction set representing the primary pattern and the secondary pattern.

* * * * *

UNITED STATES PATENT AND TRADEMARK OFFICE
CERTIFICATE OF CORRECTION

PATENT NO. : 11,170,278 B2
APPLICATION NO. : 17/006162
DATED : November 9, 2021
INVENTOR(S) : Robert J. Knorr, III et al.

It is certified that error appears in the above-identified patent and that said Letters Patent is hereby corrected as shown below:

On the Title Page

Item (57), Line 12    Replace "method also includes generating a hand-level" with
-- method also includes generating a band-level --

In the Specification

Column 9, Line 47    Replace "NIC (WNIC) less adapter" with
-- NIC (WNIC) or wireless adapter --

Column 10, Line 8    Replace "another suitable UO device or a" with
-- another suitable I/O device or a --

Column 15, Line 25    Replace "using the hand-level machine" with
-- using the band-level machine --

Column 17, Line 39    Replace "can be determined h dividing the first" with
-- can be determined by dividing the first --

Column 21, Line 44    Replace "For the first finning" with
-- For the first running --

Column 22, Line 23    Replace "shown in Table 1.8 above" with
-- shown in Table 18 above --

Signed and Sealed this
Nineteenth Day of July, 2022

Katherine Kelly Vidal
*Director of the United States Patent and Trademark Office*